Patented Aug. 8, 1944

2,355,255

UNITED STATES PATENT OFFICE 2,355,255

NONFOAMING OIL-CONTAINING COMPOSITION

John C. Zimmer, Union, and William Seitz, Elizabeth, N. J., assignors to Standard Oil Development Company, a corporation of Delaware No Drawing. Application December 2, 1941, Serial No. 421,284

6 Claims. (Cl. 252—35)

This invention relates to oil containing compositions normally tending to foam which has admixed therewith compounds which prevent this foaming.

Certain types of compositions, such as lubricants, particularly those containing residual type lubricating oils and especially such oils containing addition agents, such as soaps, fatty oils, sulfurized fatty oils, sulfur or chlorine compounds, metallic derivatives, etc., normally tend to foam when stirred or used under high-speed conditions in which large volume of air are beaten into the lubricant. Lubricants prepared from residual stocks frequently form very stable foams which may reach such volume that the lubricant reservoir is overflowed and foam rather than oil is pumped to the gears or bearings.

It is a primary object of the present invention to add to such compositions a small amount of material having the property of preventing or reducing the foaming. Broadly, the invention comprises using as a defoaming or anti-foaming agent for such compositions a small amount of a reaction product of an amine and a sulfonated fatty compound. These reaction products also will cause contaminating moisture to separate from the oil even when present in the form of an emulsion. This is particularly desirable since water contamination from cooling systems or from combustion in internal combustion engines is a frequent cause of foam formation due to vaporization of the water as the oil heats up.

These amine reaction products of sulfonated fatty compounds may be prepared by known methods, such as by slowly heating a sulfonated fatty compound with an equi-molecular proportion of the desired organic amine, cooling to about 190° F., adding about 10% by weight of water and cooling further to room temperature.

The sulfonated fatty compound may be a sulfonated vegetable, animal, or fish oil, such as sulfonated derivatives of the following fatty oils; castor oil, cottonseed oil, corn oil, oleic, linoleic, stearic, palmitic, euricic acids, naphthenic or oxidized petroleum acids.

The organic amines to be reacted with such sulfonated fatty compounds may be either aliphatic or cyclic, examples of which include (1) alkyl amines, such as butyl, amyl, hexyl, propyl, diamyl amine, etc.; (2) aryl amines, such as aniline, toluidine, naphthylamine, and the like; (3) cyclo aliphatic amines, such as di-cyclohexyl amine; and (4) mixed amines, such as N-amyl cyclohexyl amine.

These amine reaction products of sulfonated fatty compounds range from light, mobile liquids to solids and are soluble in mineral oils.

Commercial products marketed under the trade name of Dismulgans may also be used. Two such products known as Dismulgans V and Dismulgans VI have been found very satisfactory for the purposes of this invention. These Dismulgans products are understood to consist of sulfonated amines or amides of fatty oils, and it is understood that they can be prepared by the manner hereinabove described, namely, by reacting an organic amine with a sulfonted fatty oil.

Partial chemical analysis of Dismulgans V and VI indicates that they contain:

|  | Per cent |
|---|---|
| Nitrogen | 0.75 |
| Sulfur | 2.50 |
| Ash | 8.12 |

The amount of the novel defoaming or anti-foaming agent of this invention to be used, will, of course, depend to some extent upon the oil composition in which it is to be used and the severity of the mechanical beating action of the operating conditions in which it is to be used in service; however, ordinarily an amount between .01% and 5.0% by weight on the weight of the oil composition will be sufficient and generally the amount required will be between the preferred limits of 0.1% and 1.0%.

The oil compositions with which this novel defoaming agent are to be used may consist either of a hydrocarbon oil liquid alone, especially such fractions as are customarily used for lubricating purposes, or together with the various addition agents commonly added to such a hydrocarbon oil base stock in preparing finished lubricants, as will be discussed more fully later.

The hydrocarbon oil base stock may be prepared from various types of crudes, such as paraffinic, napththenic, asphaltic or mixed base crudes and may comprise either distillates or residuals, which may or may not have been subjected to various purification or refining treatments, such as clay filtering, solvent extraction, acid treating, etc. The viscosity of this lubricating oil base stock should be between the approximate limits of 40 and 600 seconds Saibolt at 210° F.

The invention applies particularly to lubricating compositions containing a major proportion of a mineral oil base stock, such as described above, together with a substantial addition, e. g., 5-20% or so of a lead compound adapted to increase the lubricating-film strength or load-carrying capacity of the mineral oil base stock. Suitable lead compounds include lead oleate, lead naphthenate, lead sulfonate and the corresponding calcium, barium, magnesium, zinc, tin, or copper soaps can also be used.

Still other optional addition agents include other extreme-pressure lubricating addition agents, such as, halogen-containing compounds and sulfur compounds. For instance, the lubricating composition may contain 5-50% of an organic compound containing active chlorine, such as chlorinated paraffin wax or chlorinated kerosene, and/or 1-30% of a sulfur compound, such as sulfurized lard oil, sperm oil, mineral oil, isobutylene polymer, or the corresponding sulfur and chlorine compounds prepared by reaction with sulfur halides. Other compounds containing both chlorine and sulfur, such as reaction products of chlorinated hydrocarbons with alkali sulfides, hydrosulfides, xanthates, mercaptides, thiocyanates, etc. may be employed.

Other addition agents which may be used include:

| | |
|---|---|
| Ba | di-isobutyl phenol sulfide |
| Ca | lauryl phosphate |
| Zn | di-isopropyl salicylate |
| Sn | wax sulfosalicylate |
| Mg | octadecylate |
| Ca | cetylphenolate |
| Ni | oleate |
| Al | naphthenate |

A finished extreme pressure lubricant prepared as indicated above should contain about 0.1-10.0% of chlorine and/or 0.2-10% of sulfur.

These lubricants may also contain oxidation inhibitors of various types, such as tertiary butyl phenol, di-tertiary butyl phenol, secondary butyl phenol, butyl naphthol, iso-amyl phenol, tertiary amyl phenol sulfide, di-isobutyl phenol sulfide and other sulfur mono- or di-chloride reaction products of alkylated hydroxy aromatic hydrocarbons.

Having thus described the materials to be used according to this invention, some experiments will be described to illustrate the advantages and method of carrying out the invention.

Sulfonated oleic acid was reacted with n-butyl amine and sulfonated castor oil was reacted with three different amines, namely, n-butyl amine, aniline, and dicyclohexyl amine, using the reaction procedure described previously. A small amount of each of these products was then added to a lubricant consisting essentially of a residual asphaltic oil base stock having a viscosity of about 85-95 seconds vis./210° F., containing about 10% of lead oleate, and the various blends, together with some of the plain lubricant for comparison, were subjected to the standard Mixmaster foaming test, which consisted of mixing 500 cc. of the oil for 15 minutes at 550 R. P. M. paddle speed. The increase in volume over the original volume was determined immediately after the stirrer was stopped, and also again after one hour of standing. The results of this test were as follows:

TABLE 1

| Test No. | Product | Mixmaster foaming test 15 minutes at 550 R. P. M. paddle speed 500 cc. sample used | | | |
|---|---|---|---|---|---|
| | | Increase over orig. vol. after stirrer stopped | | Increase over orig. vol. 1 hour after stirrer stopped | |
| | | Cubic centimeter | Percent | Cubic centimeter | Percent |
| 1 | Lubricant A | 900 | 180 | 875 | 175 |
| 2 | Lubricant A, plus 0.5% sulfonated oleic acid-butyl amine product. | 300 | 60 | 0 | 0 |
| 3 | Lubricant A, plus 0.5% sulfonated castor oil-butyl amine product. | 300 | 60 | 0 | 0 |
| 4 | Lubricant A, plus 0.5% sulfonated castor oil-aniline product. | 100 | 20 | 0 | 0 |
| 5 | Lubricant A, plus 0.5% sulfonated castor oil-dicyclohexylamine product. | 300 | 60 | 0 | 0 |

It is noted from the above table that in the foaming test the plain lubricant A increased 180% in volume due to foaming, whereas the blends of the same lubricant, into which had been incorporated 0.5% of the various amine reaction products of sulfonated fatty compounds, increased only a relatively small amount, ranging from 20% to 60%; and it is also noted that after one hour of settling, all of the foam had completely disappeared in the samples to which the novel defoaming agent of this invention had been added, whereas the plain lubricant A still contained 175% of foam. This is particularly important since foaming becomes a serious problem when the foam persists and does not break down rapidly but continues to build up until overflow or foam rather than oil is delivered to moving parts of the machine to be lubricated.

As test No. 6, the blend used in test No. 4 was also stirred for one hour at 900 R. P. M. (maximum speed) on the Mixmaster, instead of only 15 minutes at 550 R. P. M., and it was found that the increase in volume was only 200 cc. or 40%, thus showing the efficacy of this defoaming agent under very stringent test conditions.

One percent of Dismulgans VI was added to a lead-sulfur chlorine type of lubricant (herein called lubricant B) containing 1.6% lead, 2.6% sulfur and 1.4% chlorine in an asphaltic type mineral-fatty oil.

This composition was subjected to the standard Mixmaster foam test described above (550 R. P. M.), together with some of the plain lubricant (without Dismulgans), for comparison, with the following results:

TABLE 2

| Test No. | Product | Original volume | 15 min. agitation | 1 hr. after agitation |
|---|---|---|---|---|
| | | Cm. | Cm. | Cm. |
| 7 | Lubricant B | 500 | 1,350 | 850 |
| 8 | Lubricant B, +1% Dismulgans VI | 500 | 530 | 500 |

It is noted here that the Dismulgans effected a substantial reduction in the foaming of this lubricant B which has exceptionally great foaming tendencies.

Another series of tests was made in which the same lubricant B used above was mixed with 2 volumes of water and subjected to the standard Mixmaster foam tests, both alone and together with an addition of 1% of Dismulgans V or VI, and in some cases together with an iron salt which generally increased the foaming tendencies of a lubricant. In this series of tests, each blend contained 200 cc. of lubricant and 400 cc. of water, and the mixture was stirred on the Mixmaster for 10 minutes at the maximum speed (900 R. P. M.). The results of these tests are shown in the following table.

TABLE 3

*Mixmaster tests with lubricant B plus water*

| Test No. | Percent Dismulgans V | Percent Dismulgans VI | Iron salt Percent | Iron salt Kind | Amount (cc.) of foam at end of— 0 minutes | 30 minutes | 60 minutes |
|---|---|---|---|---|---|---|---|
| 9 | | | | | 150 | 140 | 130 |
| 10 | 1 | | | | Nil | Nil | Nil |
| 11 | | 1 | | | Nil | Nil | Nil |
| 12 | | 1 | 2½ | Ferrous sulfate | Nil | Nil | Nil |
| 13 | | 1 | 5 | do | Nil | Nil | Nil |
| 14 | | 1 | 10 | do | Nil | Nil | Nil |
| 15 | | 1 | 10 | Ferric ammonium sulfate | Nil | Nil | Nil |

Table 3 shows that Dismulgans V and VI are very effective in preventing the foaming of lubricant B mixed with water, whereas without the Dismulgans the oil and water mixture foamed very substantially.

Another series of tests was made using lubricant C which consisted of an asphaltic type mineral oil residuum having a viscosity of about 165 seconds at 210° F., which is an oil base stock having very pronounced foaming tendencies. This oil was tested alone and together with 0.15% of Dismulgans V; and both tests were repeated except for the replacement of 20% of the oil with lead oleate. The foam test was made by using 500 cc. of lubricant with 15 minutes of constant stirring at a speed of 550 R. P. M. on the Mixmaster. The results of the tests were as follows:

TABLE 4

*Mixmaster tests with lubricant C*

| Test No. | Percent Dismulgans V | Percent Pb oleate | Amount (cc.) of foam at end of— 0 minutes | 30 minutes | 60 minutes |
|---|---|---|---|---|---|
| 16 | | | 1,020 | 830 | 820 |
| 17 | 0.15 | | 80 | 20 | Nil |
| 18 | | 20 | 820 | 460 | 180 |
| 19 | 0.15 | 20 | 20 | Nil | Nil |

This table likewise shows the surprising defoaming effectiveness of Dismulgans V in an oil base stock having pronounced foaming tendencies, and in a blend of such an oil with 20% of lead oleate which accentuates the foaming tendency of the oil.

It is not intended that this invention be limited to any of the materials which have been recited merely for the sake of illustration, but only by the appended claims in which it is intended to claim all novelty inherent in the invention as well as equivalents coming within the scope and spirit of the invention.

We claim:

1. A composition comprising a petroleum hydrocarbon liquid having foaming tendencies, and 0.01 to 5.0% of a defoaming agent consisting essentially of a hydrocarbon amine reaction product of a sulfonated fatty compound selected from the group consisting of sulfonated derivatives of fatty oils and higher fatty acids.

2. Composition according to claim 1 in which the hydrocarbon amine of the defoaming agent is derived from an alkyl amine.

3. Composition according to claim 1 in which the hydrocarbon amine of the defoaming agent is derived from a cyclic hydrocarbon amine.

4. A lubricating oil composition comprising a major proportion of a mineral lubricating oil, 5-20% of a lead compound adapted to increase the lubricating film strength of said mineral lubricating oil, and a small but foam-preventing amount between about .01% and 5% of a hydrocarbon amine reaction product of a material selected from the group consisting of sulfonated higher fatty acid and fatty oil.

5. A lubricant comprising a major proportion of a residual asphaltic oil, about 5-20% by weight of lead soap and about .01% to 5% of a material selected from the group consisting of "Dismulgans V" and "Dismulgans VI."

6. A lubricant comprising a major proportion of residual asphaltic oil base stock, about 5-20% by weight of lead soap and about 0.1% to 1.0% of aniline reaction product of sulfonated castor oil.

JOHN C. ZIMMER.
WILLIAM SEITZ.